United States Patent [19]

Rochas et al.

[11] Patent Number: 4,650,345

[45] Date of Patent: Mar. 17, 1987

[54] MICROWAVE RADIOMETRY METHOD AND DEVICE FOR MEASURING THE TEMPERATURE OF A MOVING, TEXTILE MATERIAL

[75] Inventors: Jean-François Rochas, Lyons; Bertrand Lapoulle, Saint Etienne; Yves Leroy; Ahmed Mamouni, both of Villeneuve D'Asco; Jean-Claude Van de Velde, Mons en Baroeul, all of France

[73] Assignees: Institut Textile de France, Boulogne Billancourt; CNRS, Paris, both of France

[21] Appl. No.: 787,652

[22] Filed: Oct. 16, 1985

[30] Foreign Application Priority Data

Oct. 19, 1984 [FR] France .................. 84 16087

[51] Int. Cl.$^4$ .................. D06C 7/00; G01J 5/00; G01N 25/00
[52] U.S. Cl. .................. 374/9; 26/1; 219/533; 324/58.5 R; 374/45
[58] Field of Search .......... 374/122, 121, 120, 124, 374/166, 167, 137, 126, 9; 73/159, 160; 26/51.5, 18.5; 333/99, 248; 219/10.55 A; 324/58.5 R

[56] References Cited

U.S. PATENT DOCUMENTS

| | | |
|---|---|---|
| 2,603,688 | 7/1952 | Cole et al. .................. 250/341 X |
| 3,457,385 | 7/1969 | Cumming .................. 219/10.55 A |
| 3,552,203 | 1/1971 | Freeh .................. 73/159 |
| 3,552,645 | 1/1971 | Boyd .................. 374/126 |
| 3,560,695 | 2/1971 | Williams et al. .................. 333/248 |
| 3,586,970 | 12/1968 | Conway .................. 324/58.5 C |
| 3,595,070 | 7/1971 | Smith .................. 73/159 |
| 4,106,340 | 8/1978 | Hamid .................. 374/122 X |
| 4,309,609 | 1/1982 | Sampson .................. 250/354.1 X |
| 4,322,971 | 4/1982 | Strobel .................. 73/159 |
| 4,408,903 | 10/1983 | Baldasarri .................. 374/126 |
| 4,434,342 | 2/1984 | Schubring .................. 324/58.5 C |
| 4,439,049 | 3/1984 | Hoogedoorn et al. .................. 374/124 |
| 4,465,382 | 8/1984 | Iuchi et al. .................. 374/126 |
| 4,477,707 | 10/1984 | Kim .................. 219/10.55 A X |
| 4,498,765 | 2/1985 | Herve .................. 374/126 X |
| 4,502,793 | 3/1985 | Smith et al. .................. 73/159 |
| 4,510,390 | 4/1985 | Rajchman .................. 250/354.1 X |
| 4,593,168 | 6/1986 | Amada .................. 219/10.55 A |

FOREIGN PATENT DOCUMENTS

0659613 2/1965 Belgium.

OTHER PUBLICATIONS

"Determining Emissivity" B. Bernard, Instruments & Control Systems, vol. 37, #5, pp. 87-89.

Primary Examiner—Daniel M. Yasich
Attorney, Agent, or Firm—Poms, Smith, Lande & Rose

[57] ABSTRACT

The temperature of a planar material (8) moving down a process path is measured by causing the material to pass through two openings (3,4) made in a waveguide (1) in such a way that the material effectively does not cut the electric field lines present on the walls of the guide (1) and also so the material (8) passes through the guide in a direction generally parallel to the electric field in the propagation mode of the waveguide and through a region of maximum field strength. The temperature of the planar material (8) is determined by measuring the thermal noise emitted by the material (8) as it passes through the slotted waveguide (1). The slots (3,4) for a rectangular waveguide operating in the TE$_{10}$ mode are made along the centerline of the two broad sides of the guide.

13 Claims, 6 Drawing Figures

MICROWAVE RADIOMETRY METHOD AND DEVICE FOR MEASURING THE TEMPERATURE OF A MOVING, TEXTILE MATERIAL

This invention concerns the measurement of the temperature of a planar material, based upon said material's emittance of thermal noise in the microwave portion of the electromagnetic spectrum; specifially, it concerns the measurement of the temperature of a material in process, ie. moving down a production line in the course of its manufacture or processing, said material being for example one such as a textile, including a knitted fabric, or paper or a non-woven fabric.

Temperature is very often a paramount parameter in manufacturing as well as in processing and finishing operations on a material. Moreover, when such operations are part of a continuous process, it is important that the temperature be kept constant for the duration of the process to ensure consistent characteristics for the final product.

There are many known techniques for measuring the temperature of a planar material in process. Generally, these measure the temperature of the surrounding medium in which the material is moving, for example the air temperature in a tenter drying section, by means of thermometers placed in various locations within the section. However, this technique does not provide temperature data about the material itself, which depending upon its structure and composition may react in different ways to a given ambient temperature. Another temperature measurement technique makes use of the material's radiant emittance in the infrared frequency range; this technique effectively measures the temperature of the material itself, rather than of its environment, since what is measured is the incoherent radiation or thermal noise emitted by the material, to derive its temperature. Since the electromagnetic emissions of materials is greatest in the infrared range at temperatures close to room temperature, infrared sensors have come into widespread use. Yet the very principle of this type of measurement entails drawbacks which considerably restrict its industrial applications: IR radiation from deep within the material is attenuated by the material itself before reaching the receiving sensor. Besides, the radiation emitted in this range of wavelengths by a given material at a given temperature, varies according to the color of the material—an obvious liability in the textile industry.

The prior art in the medical field otherwise teaches the use of microwave thermography, which is also based upon the thermal noise emitted by a body, albeit in this case in the microwave range. The use of these wavelengths enables measurement of the temperature of a volume of the body and not just of the surface alone, since microwaves, up to a certain depth, are not arrested by the body itself. In this case, the difficulty resides in the sensitivity of the sensors, since the emitted energy of the same body in the microwave frequencies is much weaker and is in fact on the order of $10^8$ times less than the radiant energy emitted in the infrared range. Besides this, the sensor or transducer must measure the thermal noise emitted by the material whose temperature one wishes to monitor and not the noise emanating from the material's environment. In the medical field, detection is accomplished by using a flat sensor that is applied to the outside surface of the volume under investigation: living tissues emit thermal noises which are picked up by the sensor and selected in a band of frequencies within the microwave range, then transmitted to a wideband receiver-amplifier tuned to a frequency within said band. The sensor, being applied directly to the skin, receives only the thermal noises emitted by the volume being investigated and not those from the surrounding medium. This technique is not practical for thermography in manufacturing or otherwise processing moving, planar materials. In fact the sensor's direct contact with the material could cause drastic defects. Besides, the radiant emittance of planar materials like textiles, being relatively small compared with that of living tissues, yields a very low-powered received signal. Furthermore, textile-type materials exhibit low dielectric losses (especially polyester and polyamide) and their thickness being substantially less than a microwave wavelength, the thermal noise emitted by the surrounding medium is transmitted to the receiver-amplifier via the sensor applied to the material, which no longer acts as a shield. These signals from the surrounding medium are often more powerful than those emitted by the material itself.

We have discovered a method, which is the object of this invention, for measuring the temperature of a planar or flat material being conveyed in a process situation, based upon the radiant emittance of said material in the microwave region of the electromagnetic spectrum, which method does not have all of the above-mentioned drawbacks. This method consists in running the material through a waveguide, through two openings made in such a way that they effectively do not cut the electric field lines present on the walls and by the same token provide for the material in the waveguide to move in a general direction parallel to the electric field in the propagation mode of said guide and pass through a region of maximum field strength, and in measuring the thermal noise emitted by the material during its passage through the slotted waveguide. Thus, the material goes through the slots provided in the waveguide without making mechanical contact with the latter; the direction of conveyance of the material and the choice of slot location enable, on the one hand, a very satisfactory coupling to be obtained between the material and the waveguide and, on the other hand, a reduction of the parasitic radiation of the ambient medium to an acceptable level not masking the radiation emitted by the material inside the waveguide. In fact, since the material, in keeping with the method of the invention, passes through a region of maximum field and parallel to said field, the efficiency with which emitted energy is transformed into received energy will be close to 100%: all the thermal noise emitted by the material will be able to be transmitted to the receiver. In addition, since the openings or slots made in the waveguide are located such as to practically not cut the field lines present in the walls, there is little leakage one way or the other: the leakage affecting the thermal noise emitted by the material in the waveguide is low, and the leakage affecting the thermal noise emitted by the ambient medium outside the waveguide is low.

The inventive method is particularly suitable for a process subjecting a material to a continuous heat treatment, in which one wants to control the heating means on the basis of the temperature actually exhibited by the material itself. In this case, the heat treatment means are regulated according to the radiant energy measurement obtained. According to a preferred control mode, the difference in radiant energy between the material, on the one hand, as it moves through the slotted waveguide, and a control sample of the same material, on the other hand, which has been heated to the desired temperature, is measured and the heat treatment means are controlled on the basis of the observed difference. This type of control is particularly worthwhile because it frees one from having to consider the dielectric properties of the material. Indeed, each material exhibits its own particular loss characteristic as a function of temperature. It is therefore normally necessary to be familiar with this loss-temperature relation in order to translate emissivity information into temperature information for a given material, and to draw up the corresponding scaling curves. The differential-emittance method according to the invention precludes the need for such scaling curves because the control of the heat treatment means is a null-seeking control, ie. it seeks merely to cancel any observed difference between the emitted radiation of the material in process and the control material at the desired, preset temperature. A positive deviation or negative deviation of the material-in-process radiant emittance will trigger action either on the heating means or the material feedrate to cancel this deviation.

Preferably, the general direction followed by the material as it is conveyed through the process is not perpendicular to the direction of propagation of the wave in the waveguide.

It is another object of the invention to provide a device specifically designed to implement the above-described measurement method. This device consists of:

a waveguide provided with two slots designed to allow the material to pass therethrough in proceeding down the process path, said two slots being made such as to effectively not cut the field lines present on the walls of the waveguide and so that the plane passing through the two slots is in a region of maximum field strength, parallel to the electric field in the waveguide's propagation mode;

and a receiver-amplifier connected to the waveguide and operable to measure the thermal noise emitted by the material as it passes through the waveguide.

In the case of a rectangular waveguide operating in the $TE_{10}$ mode, the two openings are made along the centerlines of the two broad sides. In this type of waveguide, which is well-known by microwave specialists, the electric field has a general orientation which is perpendicular to the two broad sides of the waveguide and a maximum component in the median plane of the waveguide (FIG. 1); also, looking at the configuration of the field lines on the waveguide walls (FIG. 2), it can be seen that none of these lines is cut by the plane passing through the center of the two broad sides of the guide. There will therefore theoretically not be any interferences with the wave's propagation, nor any conflict with the thermal noise emitted by the outside resulting from said two openings, whose length is not limited. In fact, the planar material whose temperature one wishes to measure having a certain thickness, it is necessary to provide openings allowing contact-free passage of the material and thus large enough to ensure that no contact will occur. To keep leakage to a minimum, it is nevertheless necessary for the width of each opening to be at most equal to a third of the length of the long dimension of the cross-section of the waveguide.

In the case of a circular waveguide operating in the $TE_{10}$ mode, the two openings must be made following the two diametrically opposite generatrices facing the regions of maximum field strength.

It is within the competence of a person skilled in the art to position the openings for passage of the planar material so that the criteria defined in the foregoing are complied with.

The invention will be more readily understood in reading the description made hereinafter of a preferred embodiment and a drawing in which.

Figure 4:
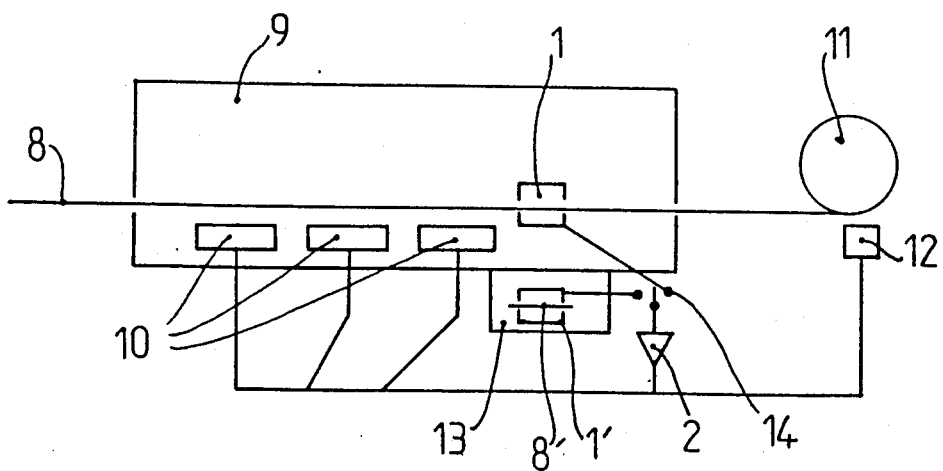

and FIG. 4 is a diagram of a cloth heat treatment installation incorporating the device according to the invention for differential emittance based control.

Figure 1:
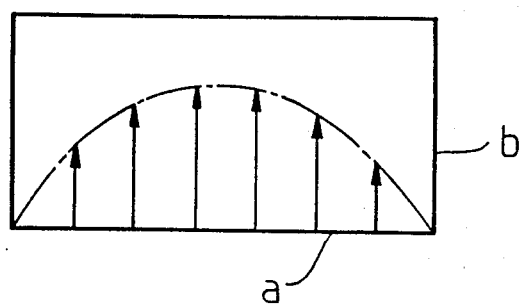
FIG. 1 is a cross-sectional view of the electric field lines within the walls of a rectangular waveguide.
Figure 2:
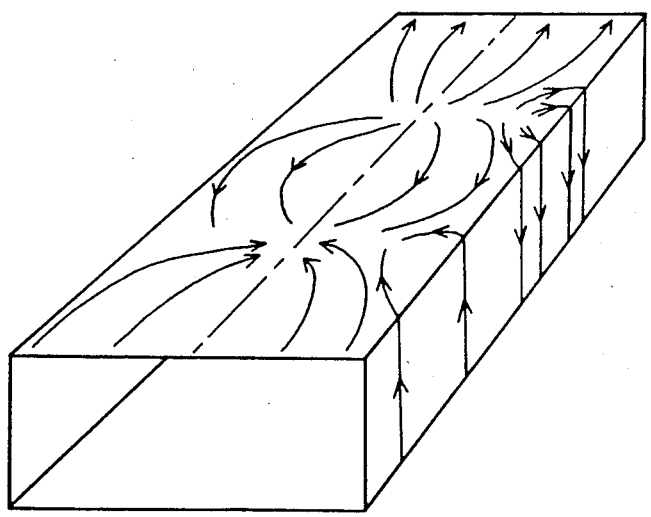
FIG. 2 shows the configuration of the field lines on the walls of a rectangular waveguide.
Figure 3:
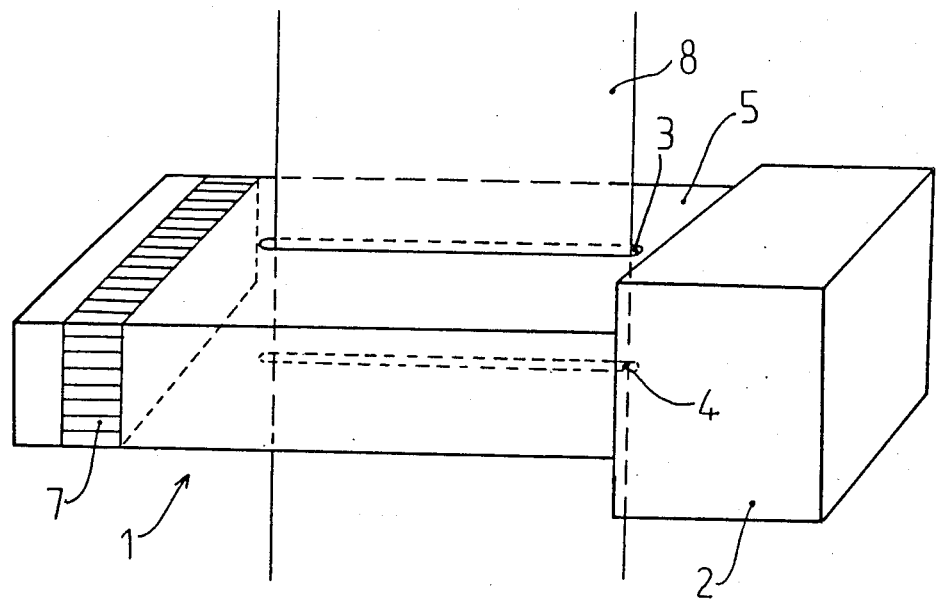
FIGS. 3a, 3b and 3c are different views of the device according to the invention.
Figure 3:
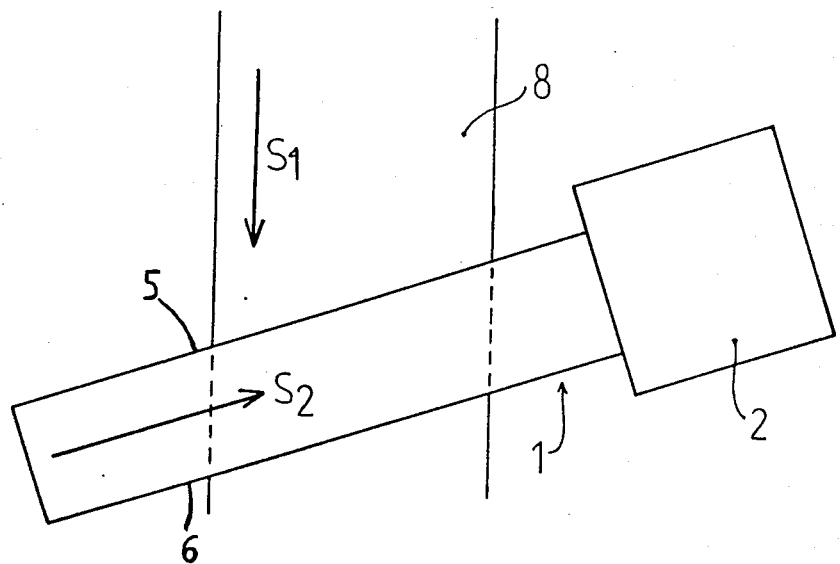
Figure 3:
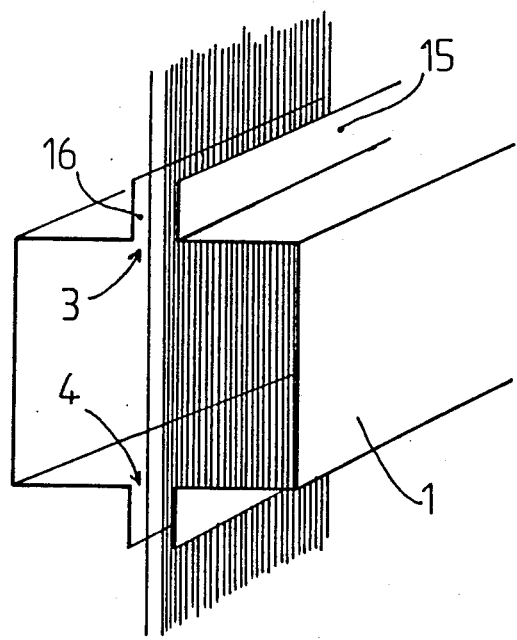

The device according to the invention comprises the waveguide 1 and the receiver 2. The waveguide 1 has a rectangular cross section with a long dimension of length a and a short dimension of length b. It operates on the fundamental mode $TE_{10}$ and the wavelength λ corresponding to the receiver's tuned frequency is such that a<λ<2a. For a frequency between 2 and 4 GHz, the dimensions of the rectangular cross-section of the waveguide 1 will for instance be: a=8 centimeters, b=4 centimeters. For a 10 GHz frequency, they will be respectively: a=3 cm, b=1.5 cm. The waveguide 1 is slotted by two openings 3 and 4, made along the centerlines of the two broad sides of the guide, respectively labelled 5 and 6. The width of the two openings 3 and 4 for passage of the cloth 8 is 2 cm when a=8 cm and 0.75 cm when a=3 cm. The waveguide 1 is closed at one end by a moving short circuit 7 whose position within the guide 1 can be adjusted to match the impedance with the material present in the guide 1. The other end of the guide 1 is connected to the receiver 2. The cloth 8 goes through the guide 1 by entering through opening 3 and leaving through opening 4. A compressed air supply, not shown, can be included to create a slight overpressure inside the waveguide 1 relative to the surrounding medium; this is especially worthwhile if the surrounding medium is polluted with dust or vapors and the like, to prevent fouling of the inside of the waveguide and the attendant disturbance of emissivity measurements. Also, if large openings 3 and 4 are used, it can be worthwhile, for the purpose of preventing disturbances, to extend each opening with two outer lips 15 and 16 arranged parallel to one another and to the general direction followed by the cloth 8 as it passes through the guide 1 (FIG. 3c).

Operation of the device is as follows:

The receiver 2 is tuned to a center frequency in the microwave frequency spectrum, from 0.5 to 10 GHz, specifically to 2.45 GHz for example. The waveguide 1 picks up the thermal noise signals emitted in its interior space, in the frequency band around the center frequency of the receiver 2. In fact the thermal noise emitted inside the waveguide 1 comes essentially from the cloth 8 the temperature of which is to be measured, since the air contained in the guide radiates practically no thermal noise when compared with the noise emitted by the cloth, and the location selected for the two openings 3 and 4 avoids disturbances from the outside. The short circuit 7 is moved at will within the waveguide 1 to adapt the length of the openings 3 and 4 to the breadth of the cloth 8 passing through the guide 1, after first calibrating the receiver 2 as required for the specific cloth 8 the temperature of which is to be measured, knowing that depending on the cloth's makeup, its loss factor will differently vary with temperature.

If the cloth 8 is stationary in the waveguide 1, the thermal noise signals emitted by the cloth and transmitted by the waveguide to the receiver 2, and also translated to temperature, correspond to the mean temperature of the volume of cloth 8 held in the waveguide, between openings 3 and 4.

When the cloth 8 moves along, the thermal noises emitted thereby are integrated by the receiver 2 at limited time intervals, enabling substantially the instantaneous and mean temperature of the entire strip of cloth 8 passing through the waveguide 1 to be known, and therefore enabling the deviations between said temperature and the desired temperature to be known. A better matching of impedance is obtained when the waveguide 1 is skewed with respect to the cloth's path, as illustrated in FIG. 3b, in other words when the general direction of cloth motion (arrow $S_1$) is not perpendicular to the direction of propagation of the wave in the waveguide (arrow $S_2$).

The differential emittance-based temperature control installation shown in FIG. 4 comprises two waveguides 1 and 1' of the same type as those previously described. The first guide 1 is traversed by the cloth 8 as the latter is being thermally treated in enclosuer 9; said enclosure is equipped with heating means 10. After going through enclosure 9 the cloth 8 is taken up on a spool 11, driven by a variablle speed motor 12. The second guide 1' is exactly like guide 1; it is located in an insulated enclosure 13 equipped with heating means not shown in the drawing making it possible to vary the temperature inside the enclosure 13 and to accurately maintain a given temperature in said enclosure. Enclosure 13 is provided with infeed means with which the operator can place a sample 8' of the cloth 8 into the waveguide 1', said being of the same width as the process clock 8. The two waveguides 1 and 1' are both connected to the same receiver 2, but due to the action of a bistable switch 14 the receiver 2 can only receive the thermal noise signals from one waveguide at a time. The receiver 2 is connected either to the heating means 10 or to the motor 12.

Operation of the system or installation as a whole is as follows. The operator introduces into waveguide 1' a sample 8' of the cloth 8 to be treated. The operator adjusts the heating means of enclosure 13 so that the temperature inside said enclosure reaches the correct treatment temperature T for the cloth 8. When said temperature T has stabilized inside enclosure 13, the treatment installation can be started up. The cloth 8 traverses waveguide 1, located in enclosure 9. Thanks to the heating means 10, which may be for example hot air generators, the inside of the enclosure is heated to a temperature $T_1$ greater than T, so that the cloth 8, which is at the outside ambient temperature when it enters enclosure 9, gradually heats to treatment temperature T and stays at this temperature.

This temperature rise and temperature maintenance can be accomplished by operating different heating units 10 disposed throughout the enclosure 9.

The waveguides 1 and 1' pick up the thermal noise signals emitted respectively by the process cloth 8 moving through waveguide 1 and by the cloth sample 8' held stationary in waveguide 1'. At regular time intervals, the receiver 2 is alternately connected to guide 1 and guide 1' and successively measures the emittance of one and the other. A correction element, operating according to the cloth 8 transport speed, makes possible to compare the measurement outputs and reveal the differences in emitted radiation. If the emittance of process cloth 8 is greater than that of the reference sample 8', this means that the temperature of the cloth 8 is higher than the treatment temperature T and the receiver acts either upon the heating means 10 or the motor 12, respectively to lower the temperature $T_1$ in enclosure 9 or to speed up the cloth 8 transport rate. Conversely, if the difference is reversed, receiver 2 acts upon said heating means 10 or motor 12 to increase the temperature $T_1$ in enclosure 9 or cut back the cloth transport speed. In practical term, receiver 2 is adjusted or set so that it will act on means 10 or motor 12 only when the detected error, whether positive or negative, reaches a given value corresponding to the allowable temperature spread for the treatment. For instance, for the thermofixing of dyes after the printing of a polyamide fabric, the temperature T would be 125° C.±2° C. The controlling receiver 2 would then be set to act upon the heating means 10 or the motor 12 only if the detected deviation in thermal noise signals exceeds a value corresponding to 2° C.

In the embodiment described in the foregoing, the specific planar material being processed was a cloth. However, the inventive method, device and installation can be applied equally to any type of textile, knit or screen, or to nontextiles such as nonwoven fabric or paper.

We claim:

1. A method for measuring the temperature of moving planar material using a microwave waveguide having a predetermined electro-magnetic field distribution therein for the propagation mode of the waveguide, and wherein there are certain predetermined areas on the walls of the waveguide where the electric current lines are substantially parallel to the longitudinal axis of the waveguide, comprising the steps of:

passing planar material through two openings in said predetermined waveguide areas of said microwave waveguide in a direction substantially parallel to the electric field of the electro-magnetic field distribution within the waveguide for the propagation mode, such that the electric current pattern present on the surface of the waveguide is not cut by said openings resulting in minimal interference with said electric field pattern; and sensing the microwave energy generated by said planar material within the microwave frequency spectrum, said energy corresponding to the temperature of said material.

2. A method as defined in claim 1 wherein said sensing step is accomplished within the microwave frequency spectrum of from 0.5 to 10 gigahertz.

3. A method as defined in claim 1 including the additional method steps of heating the planar material and controlling either the level of heating or the rate at which the planar material is passing through the system in accordance with the sensed microwave energy from said planar material.

4. A method as defined in claim 3 further comprising the step of establishing a control sample of said planar material at a predetermined temperature, and wherein said controlling step is accomplished using the difference in microwave energy sensed from the control sample and from the moving planar material.

5. A method as defined in claim 1 wherein said planar material is passed through said waveguide in a direction which is not perpendicular to the longitudinal axis of the waveguide.

6. A system as defined in claim 5 wherein said microwave receiver means operates within the microwave frequency spectrum from about 0.5 to 10 gigahertz.

7. A system for measuring the temperature of moving planar material comprising:
   a microwave waveguide having a predetermined electromagnetic field distribution therein for the propagation mode of the waveguide and wherein there are certain predetermined areas on the walls of the waveguide where the electric current lines are substantially parallel to the longitudinal axis of the waveguide;
   said waveguide having a pair of slots or openings through said predetermined areas on the waveguide;
   means for passing planar material through said waveguides by way of said slots; and
   microwave receiver-amplifier means for sensing the microwave energy generated by said planar material within the microwave frequency spectrum;
   whereby the temperature of said planar material is a function of the microwave emissions from said planar material within the microwave freqency spectrum.

8. A system as defined in claim 7 further including means for heating the planar material and means for controlling either the level of heating or the rate at which the planar material is passing through the system, in accordance with the sensed microwave energy from said planar material.

9. A system as defined in claim 8 further including means for establishing a control sample of said planar material at a predetermined temperature, and further including means for determining the difference in microwave energy sensed from the control sample and from the moving planar material and for utilizing the difference signal to actuate said controlling means.

10. A system as defined in claim 7, wherein means are provided for passing said planar material through said waveguide in a direction which is not perpendicular to the longitudinal axis of the waveguide.

11. A system for measuring and controlling the temperature of a moving planar material;
   first and second microwave waveguides each having substantially the same cross-sectional configuration, and having a predetermined electro-magnetic field distribution therein for the propagation mode of the waveguide and having predetermined areas on the walls of the waveguide where the electric current lines are substantially parallel to the longitudinal axis of said waveguide;
   both of said waveguides having openings or slots extending through the respective waveguides in said predetermined areas;
   means for passing planar material through said slots of the first of said waveguides;
   means for mounting a sample of the same planar material to extend through the slots in the second one of said waveguides to form a reference sample;
   means for maintaining said second waveguide and its enclosed sample at a predetermined temperature;
   receiver-amplifier means for detecting the microwave energy generated by said planar material within the microwave frequency spectrum, alternately from said first waveguide and from second waveguide, providing an output control signal corresponding to the difference in the signals received from said first and second waveguides;
   means for heating the planar material which is moving through said first waveguide; and
   means for controlling either the level of heating or rate at which the planar material is passing through said first waveguide in accordance with said output control signal.

12. A system as defined in claim 11 wherein said means for sensing or measuring the microwave energy generated by said planar material is accomplished within the microwave frequency spectrum from about 0.5 to 10 gigahertz.

13. A system as defined in claim 11 wherein said waveguides are rectangular in cross-section and wherein said openings or slots are located substantially in the center of the broad walls of said waveguide, aligned with the longitudinal axis of said waveguide.

* * * * *